(12) United States Patent
Asai

(10) Patent No.: US 8,289,532 B2
(45) Date of Patent: Oct. 16, 2012

(54) PRINTER CONTROLLING DEVICE

(75) Inventor: Daisuke Asai, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 1248 days.

(21) Appl. No.: 11/882,683

(22) Filed: Aug. 3, 2007

(65) Prior Publication Data

US 2008/0030779 A1 Feb. 7, 2008

(30) Foreign Application Priority Data

Aug. 4, 2006 (JP) .................................. 2006-213453

(51) Int. Cl.
*G06F 3/012* (2006.01)
*G06K 15/00* (2006.01)
(52) U.S. Cl. ...... 358/1.13; 358/1.1; 358/1.15; 358/1.16; 358/1.17; 399/85; 399/83
(58) Field of Classification Search .............. 358/1.9, 358/1.11–1.18; 399/82–85, 402–405
See application file for complete search history.

(56) References Cited

U.S. PATENT DOCUMENTS

| 6,687,019 B1* | 2/2004 | Yang ............................. 358/1.15 |
| 6,690,477 B2* | 2/2004 | Nakagiri et al. ............. 358/1.12 |
| 7,630,092 B1* | 12/2009 | Suzuki et al. ................ 358/1.14 |

FOREIGN PATENT DOCUMENTS

| JP | 4-242764 A | 8/1992 |
| JP | 11-034410 A | 2/1999 |
| JP | 11034410 A * | 2/1999 |
| JP | 2001-205900 A | 7/2001 |
| JP | 2001-260436 | 9/2001 |
| JP | 2001-341375 | 12/2001 |
| JP | 2005-78490 | 3/2005 |

OTHER PUBLICATIONS

Japanese Notification of Reasons of Rejection, w/ English translation thereof, issued in Japanese Patent Application No. JP 2006-213453 dated on Oct. 21, 2008.

* cited by examiner

*Primary Examiner* — Twyler Haskins
*Assistant Examiner* — Chad Dickerson
(74) *Attorney, Agent, or Firm* — Banner & Witcoff, Ltd.

(57) ABSTRACT

A printer controlling device capable of operating in a collate mode includes a transmitting unit configured to transmit print data representing the entire document to be printed on printing sheets and a copy command representing only one copy of the entire document is made, and adjudging unit configured to judge whether the number of sheets necessary for printing one copy of the entire document is one or more than one after the transmitting unit transmits the print data representing the entire document to be printed and the copy command representing only one copy of the entire document. The transmitting unit further transmits the print data and the copy command in different manners depending on whether the judging unit judges that the number of sheets necessary for printing one copy of the document is one or more than one.

22 Claims, 6 Drawing Sheets

PRINTER CONTROLLING DEVICE

CROSS-REFERENCE TO RELATED APPLICATIONS

This application claims priority from Japanese Patent Applications No. 2006-213453 filed on Aug. 4, 2006. The entire disclosure of the prior application is incorporated herein by reference.

BACKGROUND

1. Technical Field

The present invention relates to a printer controlling device that is configured to transmit image data to a printer, and more particularly, to a printer controlling device capable of transmitting image data in a collate mode, in which print data indicative of a plurality of pages of a document a plurality of times.

2. Related Art

Conventionally, it is known that, for printing a plurality of copies of a document including a plurality of pages with a printer, a collate mode and an uncollate mode can be selectively used. In the collate mode, a plurality copies are created on document basis, while in the uncollate mode, the plurality of copies are created on page basis. For example, when 10 copies of a document including 3 pages are printed in the collate mode, one copy of first page, second page and third page of the document is printed in this order, which is repeated 10 times. In contrast, when 10 copies of the document are printed in the uncollate mode, 10 copies of the first page are printed, and then 10 copies of the second page, and 10 copies of the third page are printed in this order. It should be noted that some printers are operable both in collate mode and uncollate mode, while there also are printers which do not have the collate mode.

For the printers which do not have the collate mode, the print data of one copy of a document should be repeatedly (i.e., the desired number of times) transmitted to the printer so that the desired number of copies of the document are printed, thereby the collate mode operation is realized. An example of such a system is disclosed in Japanese Patent Provisional Publication No. P2001-341357A (hereinafter, referred to as '375 publication).

According to the technique described in '375 publication, however, if the print data is transmitted from the personal computer to the printer in the following condition, a problem arises. That is, if the print data representing one page of document is transmitted with the collate mode setting of the personal computer, the print data is repeatedly transmitted from the personal computer to the printer. Since the document includes only one page, the desired number of copies can be obtained either in collate mode or uncollate mode. If the print data is transmitted in the uncollate mode, an operation time for creating the desired number of copies of the document can be obtained quicker in comparison with a case where the collate mode is set.

SUMMARY OF THE INVENTION

The present invention is advantageous in that an improved printer control device is provide, with which the collate mode printing operation can be performed even if the printer does not have the collate mode function. Further, above-described problem can be suppressed.

According to aspects of the invention, there is provided a printer controlling device capable of operating in a collate mode in which the printer controlling device controls a printer to print a desired number of copies of a document are printed on printing sheets on document basis. The printer controlling device is provided with a transmitting unit configured to transmit print data representing data of the entire document to be printed on printing sheets and a copy command representing only one copy of the entire document is made, and a judging unit configured to judge whether the number of sheets necessary for printing one copy of the entire document is one or more than one after the transmitting unit transmits the print data representing the entire document to be printed and the copy command representing only one copy of the entire document. The transmitting unit subsequently transmits the print data and the copy command in different manners depending on whether the judging unit judges that the number of sheets necessary for printing one copy of the document is one or more than one.

With the above configuration, since the transmitting unit varies the manner it transmits the print data and copy command depending on whether the number of sheets necessary for printing one copy of the document is one or not (i.e., more than one), it is possible to transmits appropriate print data and copy command so that the above-described deficiency of the prior art can be resolved. In particular, since whether the number of sheets is one or not is judges while the print data and copy command for the first one copy of the document is transmitted, the appropriate print data and copy command can be transmitted in a subsequent process.

According to another aspect of the invention, there is provided another printer controlling device which is also capable of operating in a collate mode in which the printer controlling device controls a printer to print a desired number of copies of a document are printed on printing sheets on document basis. The printer controlling device is provided with a transmitting unit configured to transmit print data representing data of the document to be printed on the printing sheets and a copy command representing the number of copies of the document to be made, and a judging unit configured to judge whether the number of sheets necessary for printing one copy of the entire document is one or more than one before the transmitting unit transmits the print data and the copy command. The transmitting unit transmits the print data of one copy of the entire document and the copy command representing the desired number of copies of the document to be printed if the judging unit judges that the number of sheets necessary for printing one copy of the document is one.

According to the above configuration, since whether the number of sheets necessary for printing one copy of the entire document is one or not is judged prior to transmission of the print data and copy command, the appropriate print data and copy command can be transmitted efficiently. Such a configuration is particularly convenient when the data size of the print data is relatively large, since the print data is transmitted only once.

According to a further aspect of the invention, there is provided a method of controlling a printer to print a desired number of copies of a document, the method being capable of controlling, in a collate mode, the printer so that the desired number of copies of the document are printed on a sheet on document basis. The method includes the step of transmitting print data representing the entire document to be printed on printing sheets and a copy command representing only one copy of the entire document is made, the step of judging whether the number of sheets necessary for printing one copy of the entire document is one or more than one after the step of transmitting transmits the print data representing the entire document to be printed and the copy command representing only one copy of the entire document, and the step of transmitting the print data and the copy command in different manners depending on whether the step of judging that the number of sheets necessary for printing one copy of the document is one or more than one.

Alternatively, the method may include the step of judging whether the number of sheets necessary for printing one copy of the entire document is one or more than one before the transmitting unit transmits the print data and the copy command, the step of transmitting print data representing data of the document to be printed on the printing sheets and a copy command representing the number of copies of the document to be made, and the step of transmitting transmits the print data of one copy of the entire document and the copy command representing the desired number of copies of the document to be printed if the step of judging judges that the number of sheets necessary for printing one copy of the document is one.

According to a further aspect of the invention, there is provided a computer-readable recording medium storing a program containing instructions which, when executed by a computer, causes the computer to control a printer to print a desired number of copies of a document, the computer being operable in a collate mode to control the printer so that the desired number of copies of the document are printed on a sheet on document basis. The instructions includes the steps of transmitting print data representing the entire document to be printed on printing sheets and a copy command representing only one copy of the entire document is made, judging whether the number of sheets necessary for printing one copy of the entire document is one or more than one after the step of transmitting transmits the print data representing the entire document to be printed and the copy command representing only one copy of the entire document, and transmitting the print data and the copy command in different manners depending on whether the step of judging judges that the number of sheets necessary for printing one copy of the document is one or more than one.

Alternatively, the instructions may include the steps of judging whether the number of sheets necessary for printing one copy of the entire document is one or more than one before the transmitting unit transmits the print data and the copy command, and transmitting print data representing data of the document to be printed on the printing sheets and a copy command representing the number of copies of the document to be made. The step of transmitting transmits the print data of the entire document and the copy command representing the desired number of copies of the document to be printed if the step of judging judges that the number of sheets necessary for printing one copy of the document is one.

BRIEF DESCRIPTION OF THE ACCOMPANYING DRAWINGS

FIGS. 6A-6D schematically show difference in transmitting print data.

Figure 4:
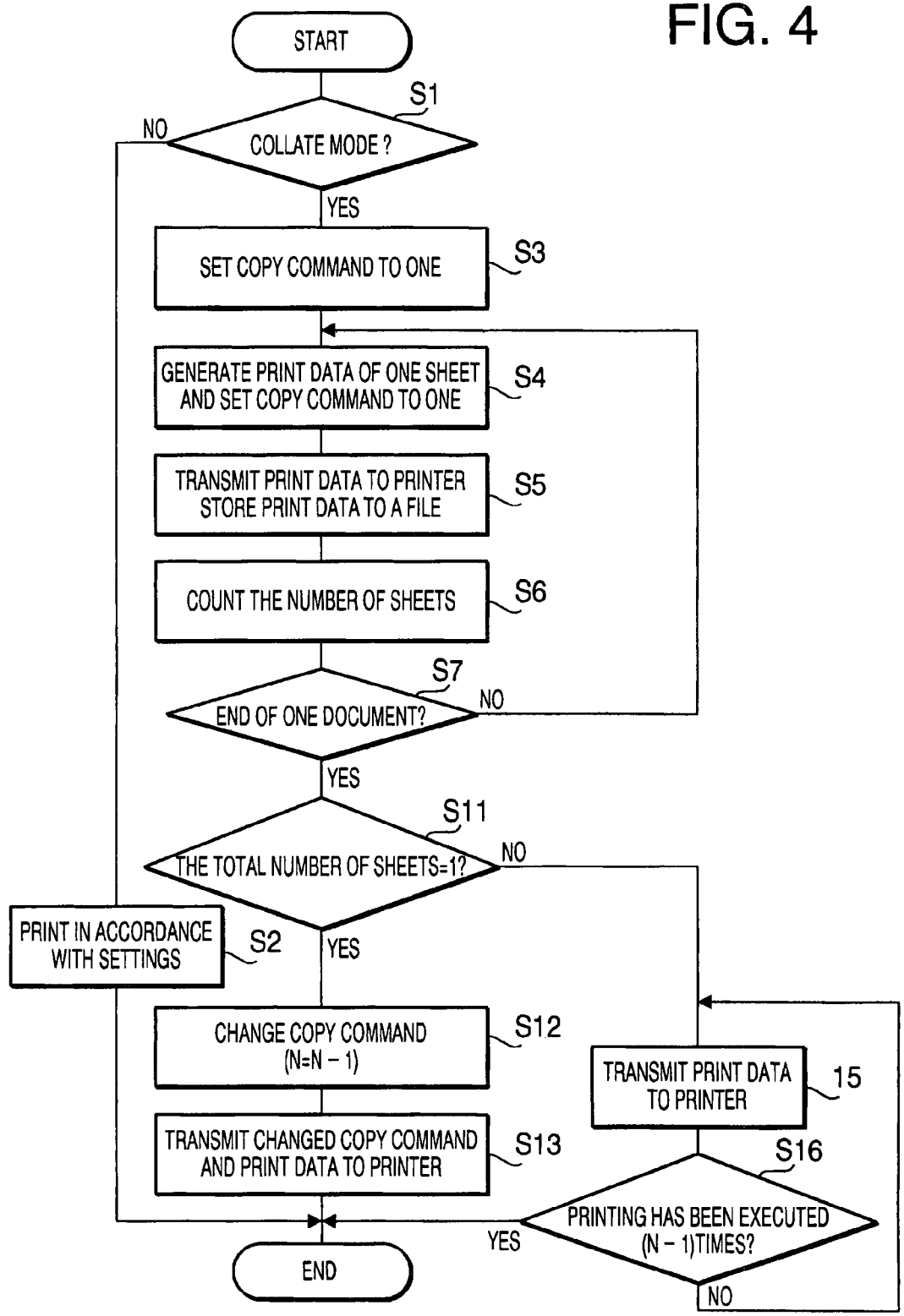
FIG. 4 is a flowchart illustrating a print operation executed in the personal computer shown in FIG. 1.
Figure 7:
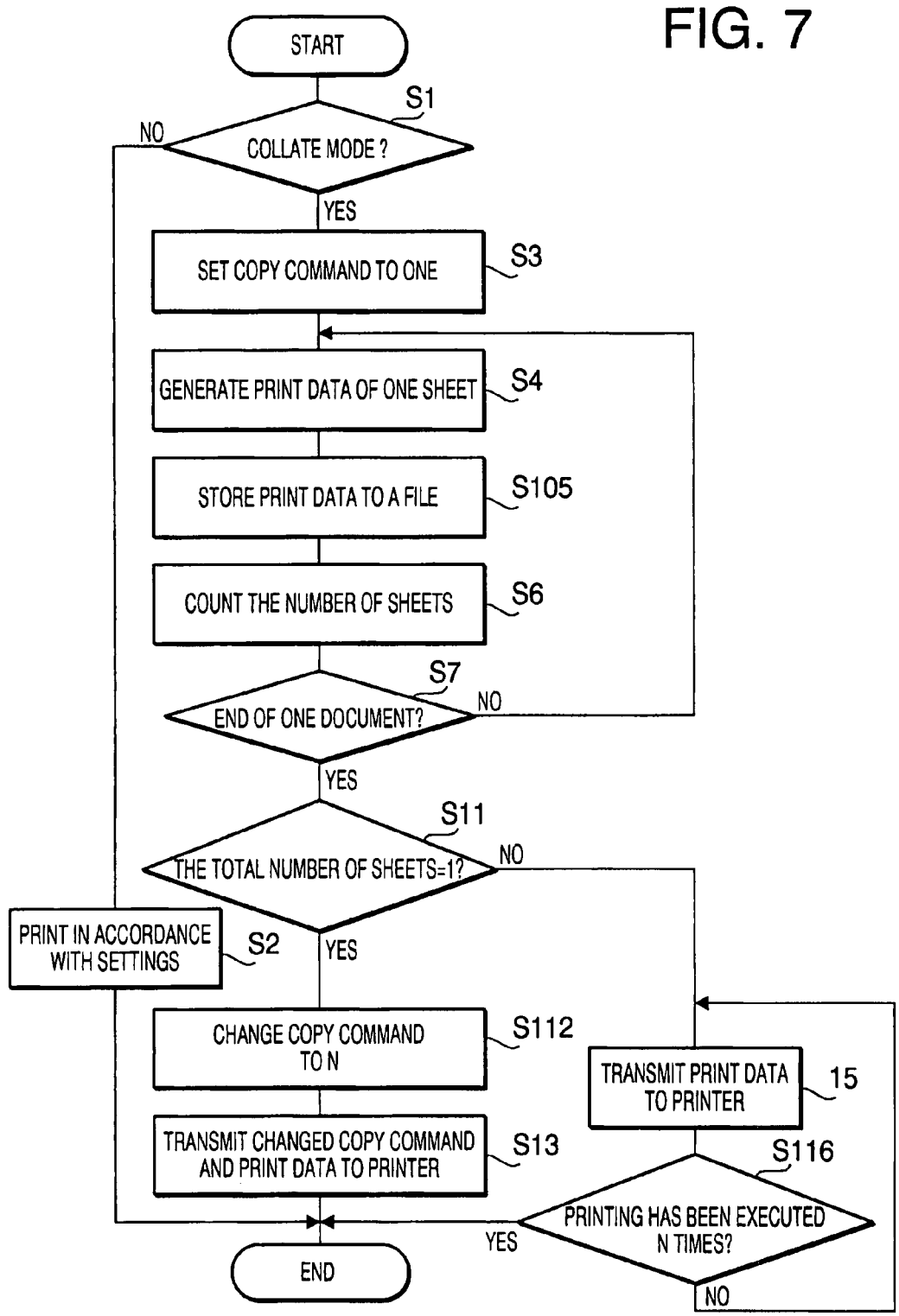

FIG. 7 is a flowchart illustrating a modification of the print operation shown in FIG. 4.

DETAILED DESCRIPTION OF THE EMBODIMENTS

Referring to the accompanying drawings, a print system according to the embodiment of the invention will be described.

Figure 1:
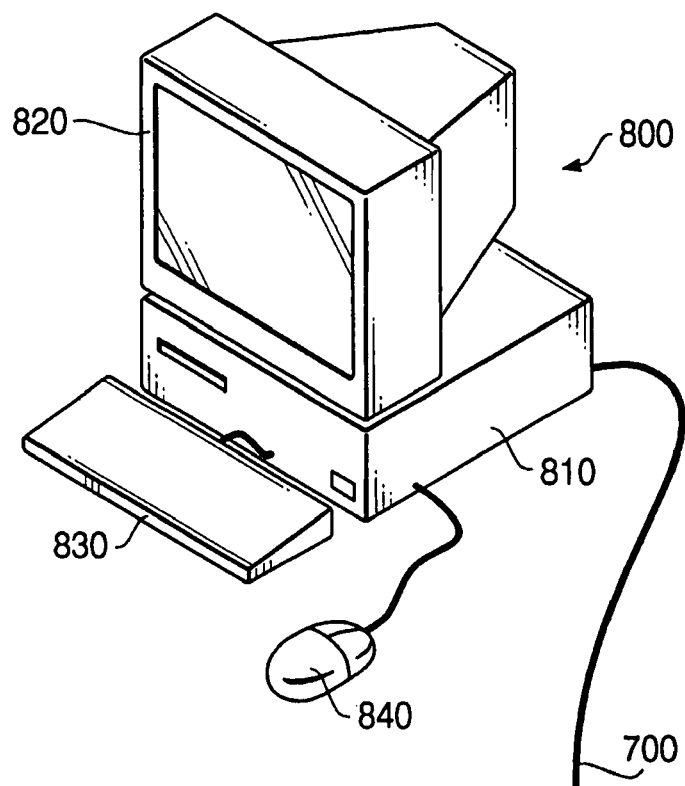
FIG. 1 shows a perspective view of a print system including a personal computer and a printer according to an embodiment of the invention.
Figure 1:
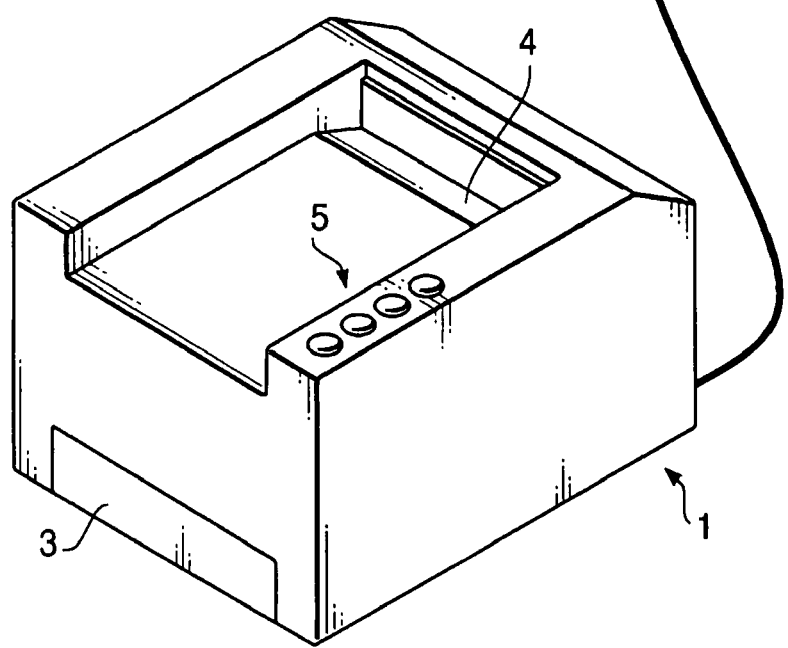

FIG. 1 shows an appearance of a print system according to the embodiment of the present invention. As shown in FIG. 1, the print system includes a color laser printer 1 (hereinafter, referred to as a printer) and personal computer 800 (hereinafter, referred to as PC) which is connected to the printer 1 via a cable 700. It should be noted that the printer 1 and the PC 800 may be connected through a network (e.g., LAN), IR (Infrared) communication system or the like.

The printer 1 is of a well-known type laser printer which includes a printer engine 2 (see FIG. 2) that forms a color image using yellow, magenta, cyan and black toners, in accordance with an electrophotographic imaging method. The printer engine 2 forms a color image on sheet drawn from a stack of sheets accommodated in a sheet tray 3 one by one. The sheet on which the color image has been formed is discharged on a stacker 4. On an outer face of the printer, an operation panel 5 allowing a user to input various settings and commands is provided.

Figure 2:
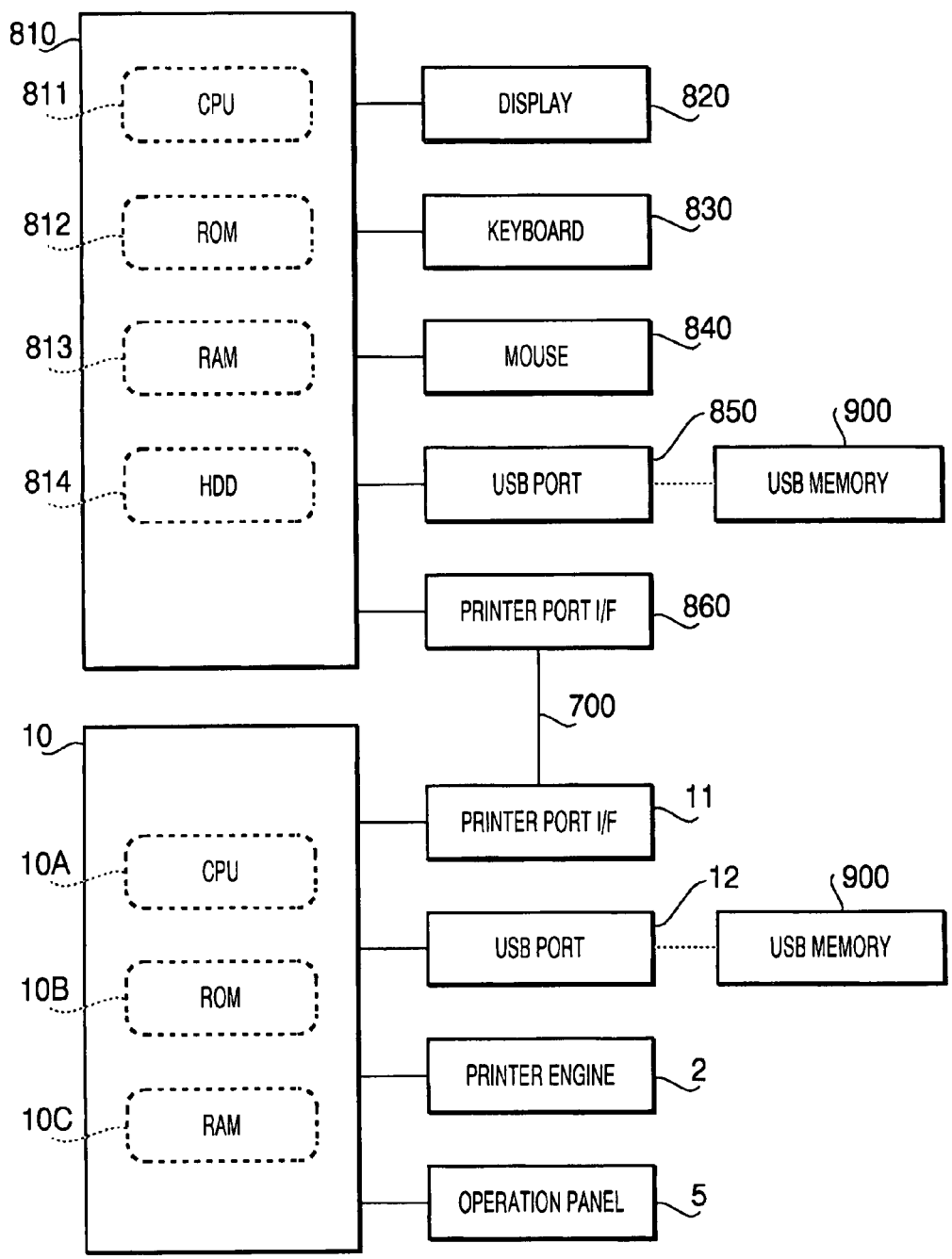
FIG. 2 is a block diagram showing a configuration of controlling systems of the print system shown in FIG. 1.

FIG. 2 is a block diagram showing a control system of the print system. As shown in FIG. 2, in a housing 810 of the PC 800, a CPU (Central Processing Unit) 811, a ROM (Read Only Memory) 812, a RAM (Random Access Memory) 813 and an HDD (Hard Disk Drive) 814 are provided. To the PC 800, a display device 820 such as a CRT display, a keyboard 830 and a mouse 840 are connected (see FIG. 1). A USB (Universal Serial Bus) port 850, to which an USB memory 900 or the like can be connected, and printer port I/F (interface) 860 are connected.

The printer 1 is provided with a control unit 10 that control the printer engine 2 and the like. The control unit 10 is configured as a microcomputer that is implemented with a CPU 10A, ROM 10B and RAM 10C. The control unit 10 is provide with the printer engine 2 described above, the operation panel 5, a printer port I/F (interface) 11 enabling a connection with the PC 800, and a USB port 12 to which a USB memory 900 is connectable are connected.

Next, a process executed by the controlling system described above will be explained. When a user inputs a command to start printing when an application is executed in the PC 800, an user setting window (user interface) 821 shown in FIG. 3 is displayed on the display device 820.

Figure 3:
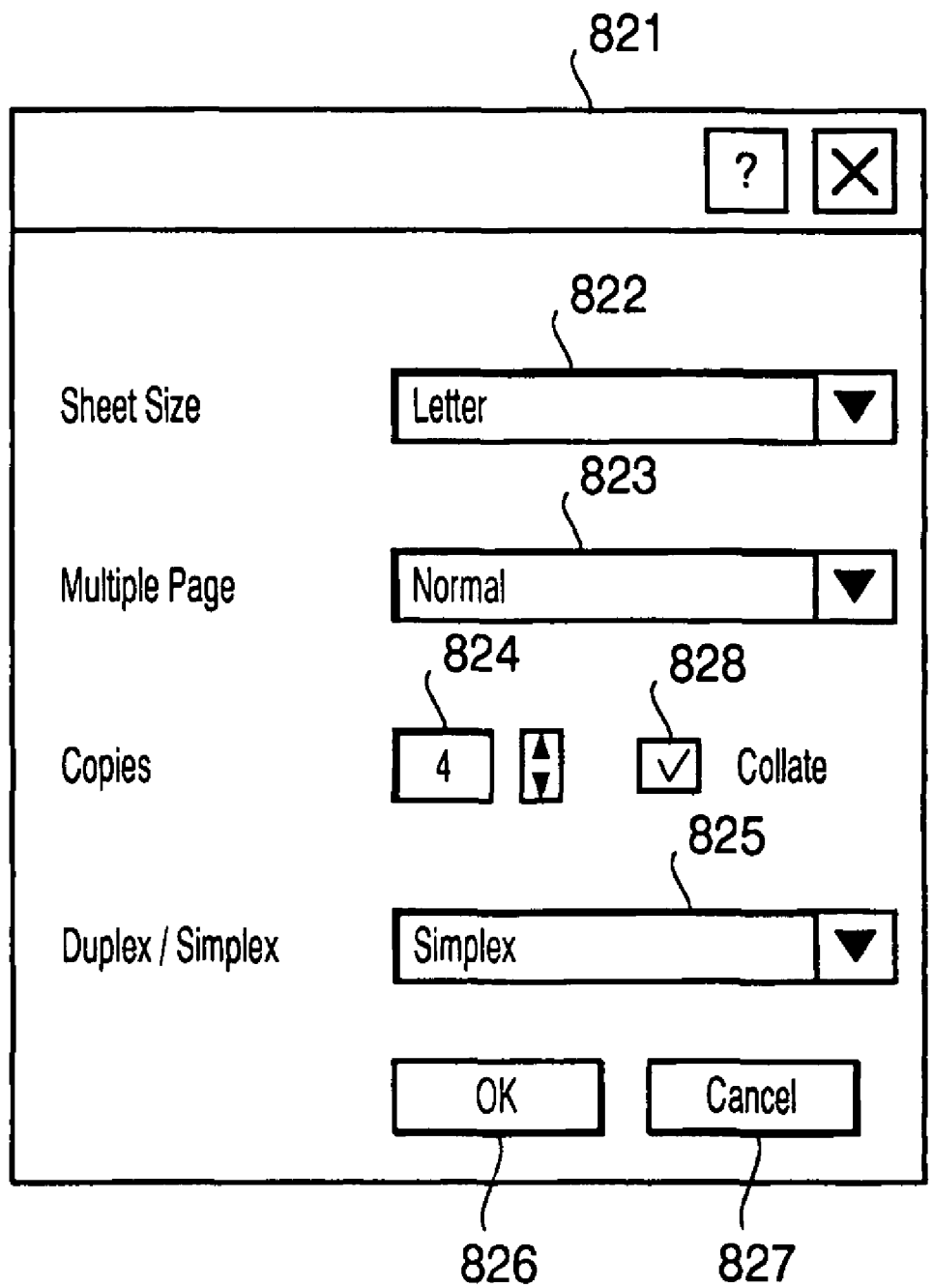
FIG. 3 illustrates a user interface (i.e., a setting window) displayed on the personal computer.

As shown in FIG. 3, in the setting window 821, items which the user can set are displayed. The items include a sheet size setting section 822, a multi-page setting section 823 for setting the number of pages to be printed on one page of the printing sheet (i.e., the number N of an N-in-one printing), a copy number setting section 824 for setting the number of copies to be printed, a duplex setting section 825 for setting whether a duplex printing is performed or not (i.e., a simplex printing: non-duplex printing), an OK button 826 and a cancel button 827. Each of the sheet size setting section 822, multi-page setting section 823 and duplex setting section 825 are configured such that a pull-down menu is displayed when an arrow button is clicked with the mouse 840.

The copy number setting section 824 is configured such that, by clicking up/down arrows with the mouse 840, the number displayed in the copy number setting section 824 is incremented/decremented or the user may input a desired number directly using the keyboard 830. If a value greater than one is set in the copy number setting section 824, a check box 828 becomes active. The user can activate the collate mode by inputting a check in the check box 828 using the mouse 840. If the check is removed, the uncollate mode is set.

1 When the user clicks the OK button 826 using the mouse 840, a printing in accordance with the settings made by the user at this stage is instructed. If the user clicks the cancel button 827, the printing in accordance with the settings made by the user will not be done and the settings are cancelled.

Next, the printing process will be described. FIG. 4 is a flowchart illustrating the printing process, which is performed as the PC 800 executes a program stored in the HDD 814. As described above, the printing process starts when the user clicks the OK button 826 shown in the user setting window 821.

As shown in FIG. 4, when the printing process starts, in S1, the process judges whether the collate mode is set. If the collate mode is not set (S1: NO), the process proceeds to S2. In S2, the process transmits the print data in accordance with the settings made in the user setting window 821 to the printer 1. Then, the printer executes printing in accordance with the settings made by the user in the user setting window 821.

If the collate mode is set (S1: YES), the process sets a copy command representing the number of copies to one (1) regardless of the setting made in the copy number setting section 824 (S3). Then, the process generates print data for one printing sheet(S4). For example, if the multi-page setting section 823 and the duplex print setting section 825 are set to perform a normal printing (i.e., a simplex printing with a single page on one page of the sheet), the process creates print data for one page of the sheet.

Figure 5:
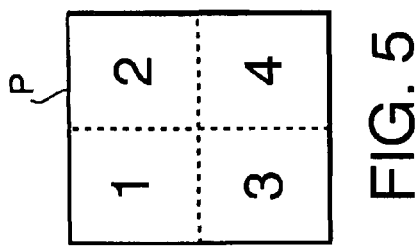
FIG. 5 illustrates an image printed by the printer shown in FIG. 1 in a "4-in-1" print setting.

The print data for a single sheet varies depending on the settings of the multi-page setting section 823 and the duplex print setting section 825. If the multi-page setting section 823 is set to "Normal" as shown in FIG. 3, an image for one page is printed on the single side of the sheet. However, if the multi-page setting section 823 is set to "4 in 1" (see FIG. 5), the process creates an image that includes four pages in a reduced and arranged manner. Thus the print data for one sheet is image data for four pages, which is printed on a single side of the sheet. If the duplex printing is set, the print data for one sheet includes image data for 8 pages.

In S5, the process transmits the print data and copy command respectively generated in S4 and S3 to the printer 1. Further, in S5, the process stores the thus generated print data in a predetermined area of the RAM 813 as a file. With execution of S5, the printer 1 prints the image(s) (or letters/characters) for the desired number of pages to be printed on one paper on a single sheet in accordance with the settings of the multi-page setting section 823 and the duplex print setting section 825 by one copy.

In S6, the process counts the number of sheets. In S7, the process judges whether printing the entire document has been printed. If the entire document has not been printed (S7: NO), that is, if only a part of the document has been printed, the process returns to S4, and repeats steps S4-S7 until the entire document has been printed. As this loop (i.e., S4-S7) is repeated, the print data for the entire document has been generated and stored in the RAM 813 as a file (S5), and the number of sheets necessary to print the entire document has been counted (S6). Further, as the loop is repeated, one copy of the document is printed (S5).

When one copy of the document has been printed (S7: YES), the process proceeds to S11, and judges whether the number of the sheets necessary for printing the entire document (hereinafter, referred to as a total number of sheets) is one. If the total number of the sheets is one (S11: YES), the process proceeds to S12.

In S12, the process changes the number of copies set to the copy command included in the print data, which has been stored in the RAM 813 as a file in S5, to a value which is decremented by one from the number (hereinafter, referred to as N) input in the copy number setting section 824 (see FIG. 3). Then, in S13, the changed copy command and the print data (as a file) are transmitted to the printer 1, and the printing process is terminated.

Figure 6A:
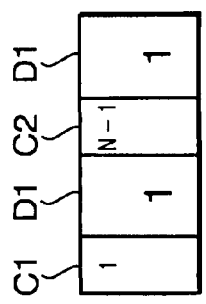

As a result of the above process, if the image to be printed corresponds to one page of sheet, the total number of sheets is one regardless of the settings of the multi-page setting section 823 and the duplex copy setting section 825. In such a case, as shown in FIG. 6A, after the print data (D1) corresponding to the "one page" is transmitted to the printer together with the copy command C1 representing the number of copies is "one" (in S5), process goes from S11 to S12 (S11: YES), and the process transmits the print data D1 to the printer 1 together with a copy command C2 (=N−1) in S13.

Figure 6B:
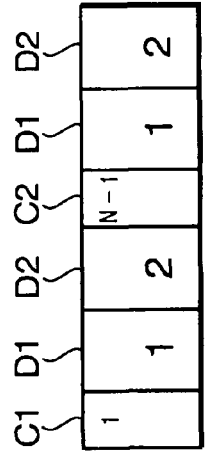

It should be noted that, if the duplex print is set or multiple-page is set, even if the image of the document is for two pages, the total number of sheets is one (S11: YES). In such a case, as shown in FIG. 6B, print data D1 and D2 corresponding to the first and second pages are transmitted to the printer 1 together with the copy command C1 in S5. Then, in S13, the print data D1 and D2 are transmitted to the printer 1 together with the copy command C2. When the above data is received, the printer 1 prints out (N−1) copies of the document as in the uncollate mode. Since, the total number of sheets is one, the above process results in the same process of printing in the collate mode.

If the total number of sheets is two or more (S11: NO), the process proceeds to S15. In S15, the print data as a file is transmitted to the printer 1 together with the copy command C1 (which is remained as "one"). In S16, the process judges whether S15 is executed (N−1) times. If step S15 has not been executed (N−1) times (S16: NO), S15 is repeated. When the S15 has been executed (N−1) times (S16: YES), the process is terminated.

Figure 6C:
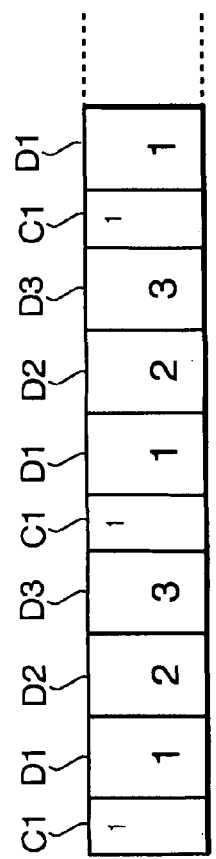

For example, if the printing is to be executed such that an image corresponding to one page of the document is printed on a single surface of each printing sheet, and the documents includes three pages of images (S11: NO), as shown in FIG. 6C, the copy command C1 (which corresponds to one page) and print data D1, D2 and D3 respectively corresponding to first, second and third page of the document are transmitted to the printer 1 repeatedly, by (N−1) times. With this configuration, even if the printer 1 cannot operation in the collate mode, it becomes possible for printer to print out a plurality of copies of the document on document basis as if the printing is executed in the collate mode.

It should be noted that, if steps S15 and S6 are executed regardless of the total number of sheets, the following problem may occur.

Figure 6D:
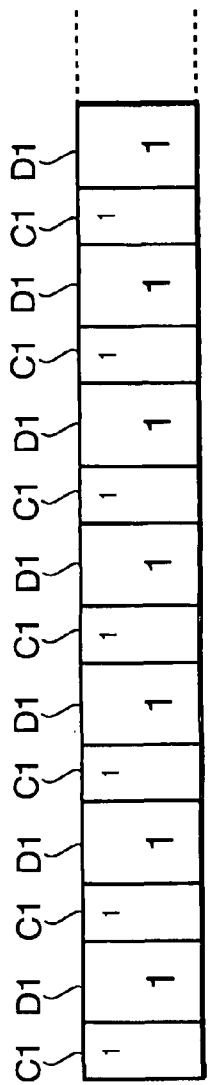

If the document includes only a single page of data, as shown in FIG. 6D, the copy command C1 and the print data D1 for one page are transmitted repeatedly, (N−1) times. If the print data is transmitted in such a fashion, a time for data transmission and/or printing is unnecessarily elongated.

In contrast, according to the embodiment described above, as shown in FIGS. 6A and 6B, if the total number of sheets is one, the copy command C1 and the print data D1 are transmitted first, and then the copy command C2 and the print data D1 are transmitted. Therefore, the quantity of the data to be processed in S5 and S13 is reduced. Thus, the time for transmitting/printing the data will not be unnecessarily elongated. If such data is transmitted, the printer 1 performs the printing operation continuously, which shorten a process time for printing the desired number of copies. Additionally, according to the embodiment, the number of sheets necessary for printing the entire document is counted (S6) during part of print data is transmitted to the printer 1 (S3-S7), the entire process speed may be further shortened.

It should be appreciated that the invention need not be limited to the configuration of the above-described illustrative embodiment, and can be modified in various ways without departing the scope of the invention.

For example, in the illustrative embodiment, the total number of sheets is counted when part of print data is transmitted to the printer. This can be modified such that the total number of sheets is counted firstly, and then the print data may be transmitted together with the copy command representing the necessary number of copies. This modification can be realized by modifying S5 such that the print data is not transmitted to the printer 1, and the copy command C2 is set to "N" instead of "N−1". Such a modification will be described with reference to a flowchart.

FIG. 7 shows a flowchart of the modified print operation, which is different from FIG. 4 in that S5, S12, S15 and S16 have been changed to S105, S112 and S116, respectively. In S105, the process stores the print data generated in S4 but does not transmit the print data. In S112, the process sets the copy command to "N" as mentioned above since the print data has not been transmitted to the printer 1. In S116, the process judges whether printing of the document based on the print data has been repeated "N" times. If the printing has not been repeated "N" times (S116: NO), the process repeats transmission of the print data and print command representing one so that the printing operation is repeated in document basis. In such a modified configuration, when the number of the sheet for printing the entire document is one, the number of transmission of the print data is reduced by one time. Therefore, if the size of the print data is relatively large, such a modification conveniently reduce the time for printing the necessary number of copies of the document. Optionally, the size of the print data may be detected and the process of the embodiment or the modification may be selected depending on the detected size of the print data.

In the illustrative embodiment, the print controlling device is embodied by the PC 800. The configuration may be modified such that the print controlling device is implemented to the printer 1 (i.e., provided integrally with the printer 1). In such a case, the control unit 10 may control the operation of the printing process shown in FIG. 4.

It should be noted that, as recording medium, various type of storages can be used. Such storages may include ROM, RAM, CD-ROM, flexible disk, removable disk, magneto-optical disc, etc. It is also possible to use a file server on the Internet as the recording medium.

What is claimed is:

1. A printer controlling device basis, comprising:
    a processor;
    memory having instructions stored therein that, when executed by the processor, cause the printer controlling device to operate as:
    a receiving unit configured to receive print settings including a copy number setting indicating a desired number of copies of a document;
    a transmitting unit configured to transmit print data representing one printing sheet of the document to be printed and a first copy command representing that only one copy of the one printing sheet of the document is to be made regardless of the received copy number setting;
    a first judging unit configured to judge whether one copy of the entire document has been transmitted to be printed; and
    a second judging unit configured to judge whether a number of printing sheets necessary for printing one copy of the entire document is one or more than one after the first judging unit determines that one copy of the entire document has been transmitted to be printed,
    wherein the transmitting unit subsequently transmits print data representing the entire document and a second copy command, and
    wherein the second copy command indicates different numbers of copies to be made depending on whether the second judging unit judges that the number of printing sheets necessary for printing one copy of the document is one or more than one.

2. The printer controlling device according to claim 1,
    which is configured to operate in a collate mode in which a desired number of copies of a document are printed on printing sheets on a document basis and an uncollate mode in which a plurality of copies of a document is printed on a printing sheet basis; and
    wherein the memory further comprises instructions stored therein that, when executed by the processor, cause the printer controlling device to further operate as a switching unit that switches the operation mode of the printer controlling device between the collate mode and the uncollate mode.

3. The printer controlling device according to claim 1,
    wherein, if the second judging unit judges that the number of printing sheets necessary for printing one copy of the document is one, the second copy command indicates that the number of copies to be made is the desired number of copies decremented by one.

4. The printer controlling device according to claim 3, wherein, if images are to be printed on both sides of a particular printing sheet, the second judging unit counts the particular printing sheet as one printing sheet when judging the number of printing sheets necessary for printing one copy of the document.

5. The printer controlling device according to claim 3, wherein, if a plurality of pages of the document is printed on a single side of a particular printing sheet in a reduced manner, the second judging unit counts the particular printing sheet as one printing sheet when judging the number of printing sheets necessary for printing one copy of the document.

6. The printer controlling device according to claim 1, wherein, if the second judging unit judges that the number of printing sheets necessary for printing one copy of the document is more than one, the transmitting unit transmits the print data representing the entire document and a copy command, indicating that one copy of the document is to be made, repeatedly, the number of repetitions being the desired number of copies decremented by one.

7. The printer controlling device according to claim 6, wherein, if images are to be printed on both sides of a particular printing sheet, the second judging unit counts the particular printing sheet as one printing sheet when judging the number of printing sheets necessary for printing one copy of the document.

8. The printer controlling device according to claim 6, wherein, if a plurality of pages of the document is printed on a single side of a particular printing sheet in a reduced manner, the second judging unit counts the particular printing sheet as one printing sheet when judging the number of printing sheets necessary for printing one copy of the document.

9. A method of controlling a printer to print a desired number of copies of a document, the method comprising the steps of:
- receiving print settings including a copy number setting indicating a desired number of copies of a document;
- transmitting, by a computer to the printer, print data representing one printing sheet of the document to be printed and a first copy command representing that only one copy of the entire document is to be made regardless of the received copy number setting;
- determining whether one copy of the entire document has been transmitted to be printed;
- judging, by the computer, whether a number of printing sheets necessary for printing one copy of the entire document is one or more than one after determining that one copy of the entire document has been transmitted to be printed; and
- subsequently transmitting, by the computer to the printer, print data representing the entire document and a second copy command,
- wherein the second copy command indicates different numbers of copies to be made depending on whether the step of judging judges that the number of printing sheets necessary for printing one copy of the document is one or more than one.

10. The method according to claim 9,
- wherein, if the step of judging judges that the number of printing sheets necessary for printing one copy of the document is one, the step of subsequently transmitting transmits the print data and the second copy command indicating that the number of copies to be made is the desired number of copies decremented by one.

11. The method according to claim 10, wherein, if images are to be printed on both sides of a particular printing sheet, the step of judging counts the particular printing sheet as one printing sheet when judging the number of printing sheets necessary for printing one copy of the document.

12. The method according to claim 10, wherein, if a plurality of pages of the document is printed on a single side of a particular printing sheet in a reduced manner, the step of judging counts the particular printing sheet as one printing sheet when judging the number of printing sheets necessary for printing one copy of the document.

13. The method according to claim 9, further comprising:
- repeatedly transmitting, by the computer to the printer, the print data representing the entire document and a copy command indicating that one copy of the document is to be made, if the step of judging judges that the number of printing sheets necessary for printing one copy of the document is more than one,
- wherein the number of repetitions equals the desired number of copies decremented by one.

14. The method according to claim 13, wherein, if images are to be printed on both sides of a particular printing sheet, the step of judging counts the particular printing sheet as one printing sheet when judging the number of printing sheets necessary for printing one copy of the document.

15. The method according to claim 13, wherein, if a plurality of pages of the document is printed on a single side of a particular printing sheet in a reduced manner, the step of judging counts the particular printing sheet as one printing sheet when judging the number of printing sheets necessary for printing one copy of the document.

16. A non-transitory computer-readable recording medium storing a program containing instructions which, when executed by a computer, cause the computer to control a printer to print a desired number of copies of a document and to perform, the steps of:
- receiving print settings including a copy number setting indicating a desired number of copies of a document;
- transmitting, to the printer, print data representing one printing sheet of the document to be printed and a first copy command representing that only one copy of the entire document is to be made regardless of the received copy number setting;
- determining whether one copy of the entire document has been transmitted to be printed;
- judging whether a number of printing sheets necessary for printing one copy of the entire document is one or more than one after determining that one copy of the entire document has been transmitted to be printed; and
- subsequently transmitting, to the printer, print data representing the entire document and a second copy command,
- wherein the second copy command indicates different numbers of copies to be made depending on whether the step of judging judges that the number of printing sheets necessary for printing one copy of the document is one or more than one.

17. The non-transitory computer-readable recording medium according to claim 16,
- wherein, if the step of judging judges that the number of printing sheets necessary for printing one copy of the document is one, the step of subsequently transmitting transmits the print data and the second copy command indicating that the number of copies to be made is the desired number of copies decremented by one.

18. The non-transitory computer-readable recording medium according to claim 17, wherein, if images are to be printed on both sides of a particular printing sheet, the step of judging counts the particular printing sheet as one printing sheet when judging the number of printing sheets necessary for printing one copy of the document.

19. The non-transitory computer-readable recording medium according to claim 17, wherein, if a plurality of pages of the document is printed on a single side of a particular printing sheet in a reduced manner, the step of judging counts the particular printing sheet as one printing sheet when judging the number of printing sheets necessary for printing one copy of the document.

20. The non-transitory computer-readable recording medium according to claim 16, wherein the instructions further cause the computer to perform the step of:
- repeatedly transmitting the print data representing the entire document and a copy command indicating that one copy of the document is to be made, if the step of judging judges that the number of printing sheets necessary for printing one copy of the document is more than one,
- wherein the number of repetitions equals the desired number of copies decremented by one.

21. The non-transitory computer-readable recording medium according to claim 20, wherein, if images are to be printed on both sides of a particular printing sheet, the step of judging counts the particular printing sheet as one printing sheet when judging the number of printing sheets necessary for printing one copy of the document.

22. The non-transitory computer-readable recording medium according to claim 20, wherein, if a plurality of pages of the document is printed on a single side of a particular printing sheet in a reduced manner, the step of judging counts the particular printing sheet as one printing sheet when judging the number of printing sheets necessary for printing one copy of the document.

* * * * *

UNITED STATES PATENT AND TRADEMARK OFFICE
CERTIFICATE OF CORRECTION

| | | |
|---|---|---|
| PATENT NO. | : 8,289,532 B2 | Page 1 of 1 |
| APPLICATION NO. | : 11/882683 | |
| DATED | : October 16, 2012 | |
| INVENTOR(S) | : Daisuke Asai | |

It is certified that error appears in the above-identified patent and that said Letters Patent is hereby corrected as shown below:

Title Page

Item (57) Abstract:
Line 5, Please delete "and adjudging unit" and replace with --and a judging unit--.

Signed and Sealed this
Third Day of September, 2013

Teresa Stanek Rea
*Acting Director of the United States Patent and Trademark Office*